United States Patent [19]

Peaker

[11] Patent Number: 5,655,788
[45] Date of Patent: Aug. 12, 1997

[54] VEHICLE AIR SUSPENSION HAVING A LIFTING SYSTEM

[75] Inventor: Martin Peaker, Chester, England

[73] Assignee: Ror Rockwell Limited, Clywd, United Kingdom

[21] Appl. No.: 525,587

[22] PCT Filed: Mar. 9, 1994

[86] PCT No.: PCT/GB94/00458

§ 371 Date: Jan. 23, 1996

§ 102(e) Date: Jan. 23, 1996

[87] PCT Pub. No.: WO94/20355

PCT Pub. Date: Sep. 15, 1994

[30] Foreign Application Priority Data

Mar. 9, 1993 [GB] United Kingdom ............ 9304750
Mar. 9, 1993 [GB] United Kingdom ............ 9304772

[51] Int. Cl.$^6$ ........................................... B60G 11/26
[52] U.S. Cl. .......................... 280/711; 280/712; 280/704
[58] Field of Search ........................... 280/711, 712, 280/704, 713; 180/24.02, 209

[56] References Cited

U.S. PATENT DOCUMENTS

| | | | |
|---|---|---|---|
| 2,970,847 | 2/1961 | Rockwell et al. | 280/74 |
| 3,201,141 | 8/1965 | Fruehauf et al. | 280/212 |
| 4,580,798 | 4/1986 | Roelofs | 280/712 X |
| 4,854,409 | 8/1989 | Hillebrand et al. | 180/24.02 |
| 4,998,749 | 3/1991 | Bockewitz et al. | 280/712 |
| 5,058,916 | 10/1991 | Hicks | 280/704 |
| 5,346,247 | 9/1994 | Snyder | 280/712 |
| 5,403,031 | 4/1995 | Gottschalk et al. | 280/704 |

FOREIGN PATENT DOCUMENTS

| | | |
|---|---|---|
| 450942 | 10/1991 | European Pat. Off. . |
| 2930155 | 2/1981 | Germany . |
| 2157240 | 10/1985 | United Kingdom . |

Primary Examiner—Christopher P. Ellis
Attorney, Agent, or Firm—Loeb & Loeb LLP

[57] ABSTRACT

There is disclosed a vehicle air suspension of the trailing arm type in which a system for lifting one or more road wheels whose load-bearing capacity is not required comprises a cradle having a platform member on which is supported an air bag. The air bag is disposed, on inflation, to act on a longitudinal member of the suspension so as to urge that member, and a road wheel attached thereto, upwardly. The cradle has a pair of arms which pass to opposite sides of the longitudinal member. Embodiments are disclosed in which the arms are adapted to be secured to a suspension damper mounting, to a pivot of the longitudinal member, or to a suspension bracket of the vehicle.

17 Claims, 7 Drawing Sheets

VEHICLE AIR SUSPENSION HAVING A LIFTING SYSTEM

The present invention relates to a vehicle air suspension system having a lifting system for lifting one or more road wheels of the vehicle.

BACKGROUND OF INVENTION

The air suspension to which this invention is applicable typically comprises a bracket secured to and depending from a chassis member of the vehicle, a longitudinal member extending generally lengthwise of the vehicle which is mounted on the bracket for pivoting about an axis generally transverse of the vehicle and which carries an air spring rearwards of the axis so that the air spring acts between the vehicle and the longitudinal member. A stub axle for rotatably mounting a wheel is secured to the member rearwards of the axis. Alternatively, the suspension may comprise two brackets, one depending from each side of the vehicle, each bracket having a longitudinal member extending generally lengthwise of the vehicle and which is mounted to the bracket for pivoting about an axis generally transverse of the vehicle and which carries an air spring rearwards of said front end portion so that the air springs act between the respective longitudinal members and the vehicle. An axle on which is carried two or more road wheels extends between and beyond the longitudinal members and is secured thereto rearwards of said front end portions. Such air suspensions are hereafter referred to as air suspensions of the type described.

Vehicles equipped with an air suspension of the type described are advantageously provided with a lifting system to lift road wheels out of contact with the road surface when their load-carrying capacity is not required, so as to reduce wear of tires and other suspension components. Typically the system will operate to lift a pair of wheels on opposite sides of the vehicle, these wheels either being mounted on a common axle or mounted independently on stub axles.

An example of an air suspension system of the type described having a lifting system is disclosed in EP-A-0 431 673. The lifting system comprises an air bag which is supported on a bracket fixed below a longitudinal member of the suspension, inflation of the air bag urging the longitudinal member upwardly. The system has disadvantages in that the bracket must be welded to a part of the vehicle chassis and a member has to be provided connected between the upper end of the air bag and the longitudinal member at its connection to the axle to control the locus of the top of the air bag.

SUMMARY OF INVENTION

The aim of the present invention is to provide an air suspension having a lifting system which may be fitted to a vehicle with a minimum of effort, either as original equipment or as a retro-fit suitable for suspensions made by different manufacturers and of different designs.

According to a first of its aspects, the invention provides an air suspension system for a vehicle comprising a longitudinal member extending generally lengthways of the vehicle and mounted to the vehicle for pivotal movement about an axis generally transverse of the vehicle, an air spring disposed to act between the longitudinal member rearwards of the axis and the vehicle, and a road wheel carrier disposed on the longitudinal member rearwards of the axis, wherein the suspension system further comprises a lifting system for lifting at least one wheel of the vehicle comprising a cradle having a platform member and two arms each arm connecting the platform member to the vehicle, the arms being disposed to opposite sides of the longitudinal member, the lifting system further comprising an air bag disposed to act between the platform member and the longitudinal member such that inflation of the air bag causes upward pivoting movement of the longitudinal member, so raising the or each wheel connected thereto.

(It is to be understood that the term "air bag" as used herein is not intended to be construed narrowly and should be taken to include bellows, air springs, and so forth.)

By supporting the platform member at opposite sides of the longitudinal member, undesirable twisting and bending stresses within the cradle may be reduced, consequentially reducing the strength required of its individual components.

The air suspension system of the present invention may be embodied as an independent system in which pairs of wheels at opposite sides of the vehicle are carried on individual stub axles. Alternatively, it may be applied to a conventional system in which pairs of wheels on opposite sides of the vehicle are carried on a common, rigid axle.

The lifting system preferably comprises anchorage means to secure a lower part of the air bag to the platform member.

Advantageously, the lifting system additionally comprises coupling means by which an upper part of the air bag is connected to the longitudinal member. More preferably, the coupling means substantially prevents relative movement between an upper surface of the air bag and the longitudinal member.

Alternatively or additionally the lifting system may further comprises guide means interconnecting an upper part of the air bag and the cradle and operable to constrain movement of an upper portion of the air bag to within a desired path. In a preferred embodiment, the guide means may comprise a beam, end portions or end fittings of which are constrained to travel within guides or slots in the arms or along the arms of the cradle.

The system may further comprise bearing means, such as a block of rubber, or plastics material to mechanically interconnect the air bag and the longitudinal member on inflation of the air bag. The bearing means may be part of, integral with, or disposed close to the coupling means.

Typically, in air suspension systems of the type described, the longitudinal member is connected to the vehicle by a pivot, which may comprise a pivot bolt extending along the pivotal axis. Advantageously, the cradle is adapted for connection to the or to part of the pivot. A cradle of this type is particularly adapted for use in cases where an air suspension system of the type described is to be provided with a lifting system after manufacture, or where attachment of the cradle by welding would not be convenient.

From a second of its aspects the invention provides an air suspension system for a vehicle comprising a longitudinal member extending generally lengthways of the vehicle and mounted to the vehicle for pivotal movement about an axis generally transverse of the vehicle, an air spring disposed to act between the longitudinal member rearwards of the axis and the chassis, a road wheel carrier disposed on the longitudinal member rearwards of the axis, and a suspension damper connected (directed or indirectly) between the longitudinal member and the vehicle, the suspension system further comprising a lifting system for lifting at least one wheel of the vehicle comprising a cradle adapted for connection to the said mounting means and an air bag supported by the cradle and arranged, on inflation thereof, to urge the longitudinal member upwardly, so raising the wheel carrier.

This aspect of the invention, by making use of a suspension damper mounting means, minimises the amount of additional work and apparatus required where a pre-existing air suspension system is to be provided with a lifting system. It may particularly be used for after-market conversion of an existing suspension system.

In suspension systems in which the damper is connected to the vehicle (directly or indirectly) by a pivot bolt, the cradle may conveniently be provided with supporting members having holes through Which the pivot bolt passes.

BRIEF DESCRIPTION OF DRAWINGS

Embodiments of the invention will now be described in detail by way of example with reference to the accompanying drawings in which.

DETAILED DESCRIPTION

With reference to FIGS. 1 to 5, an air suspension system of a vehicle comprises a bracket 10 (shown schematically in FIGS. 1 and 2) fixed to a chassis of the vehicle (not shown). The bracket 10 has first and second side members 12,14 which depend from the chassis, and a vertical front plate 16 interconnecting the side members 12,14 at their extremities foremost on the vehicle. The bracket 10 thus has a box-like construction, open to its rear and to below. At the rear, the periphery of each of the side members 12,14 has a lower portion which extends from close to the top of the bracket 10 downwardly and rearwardly of the bracket 10, each of these portions having a flange 18,20 projecting laterally therefrom.

Figure 1:
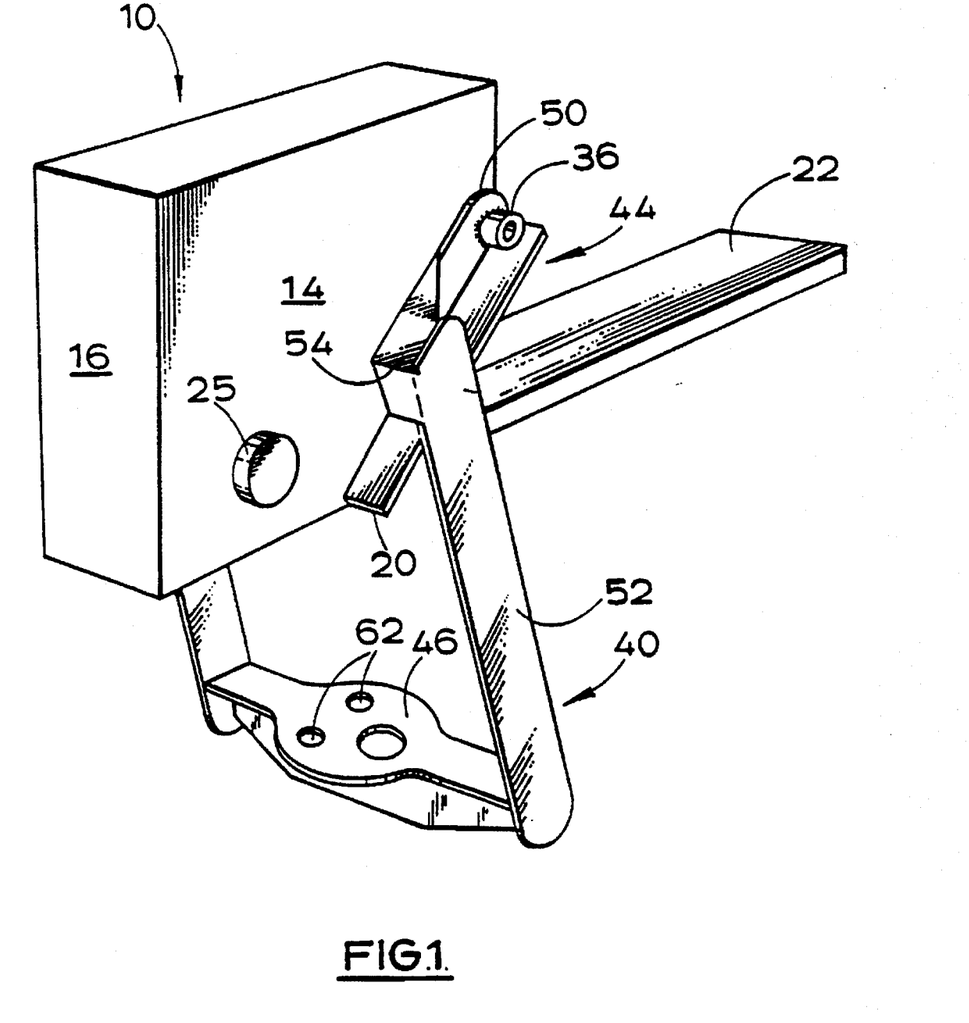
FIG. 1 is a perspective view of a cradle being a part of a first embodiment of the invention carried by a suspension bracket and also showing part of a longitudinal member of the suspension.
Figure 2:
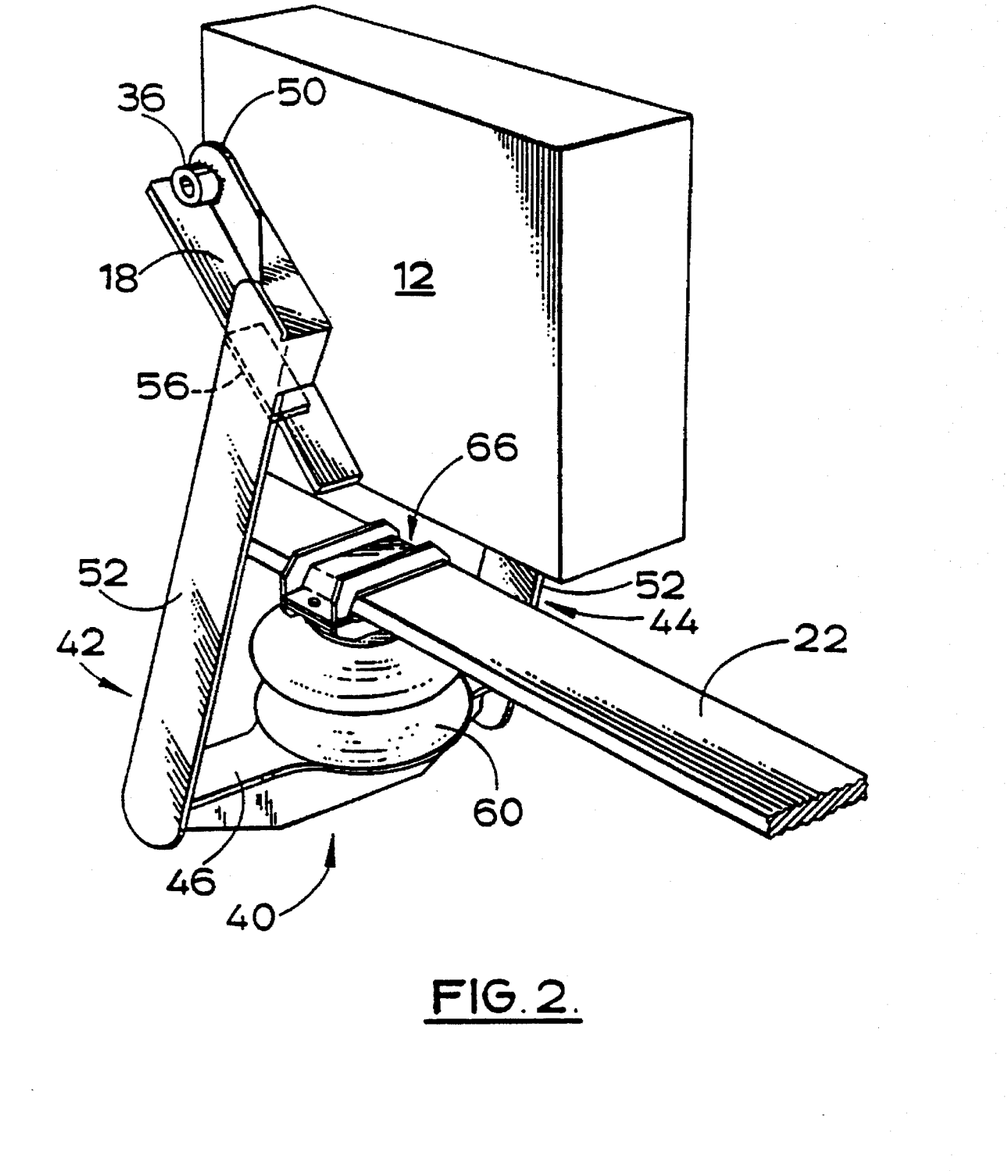
FIG. 2 is similar to FIG. 1 but seen from the opposite end and includes an air bag and clamp.

A longitudinal member 22 is connected within the bracket 10 to a pivot of conventional form comprising a pivot bolt 24 passing through spigots 25 which project laterally from each side member 12,14 of the bracket 10. The pivot permits movement of the longitudinal member 22 about a horizontal axis towards its forward end.

Figure 3:
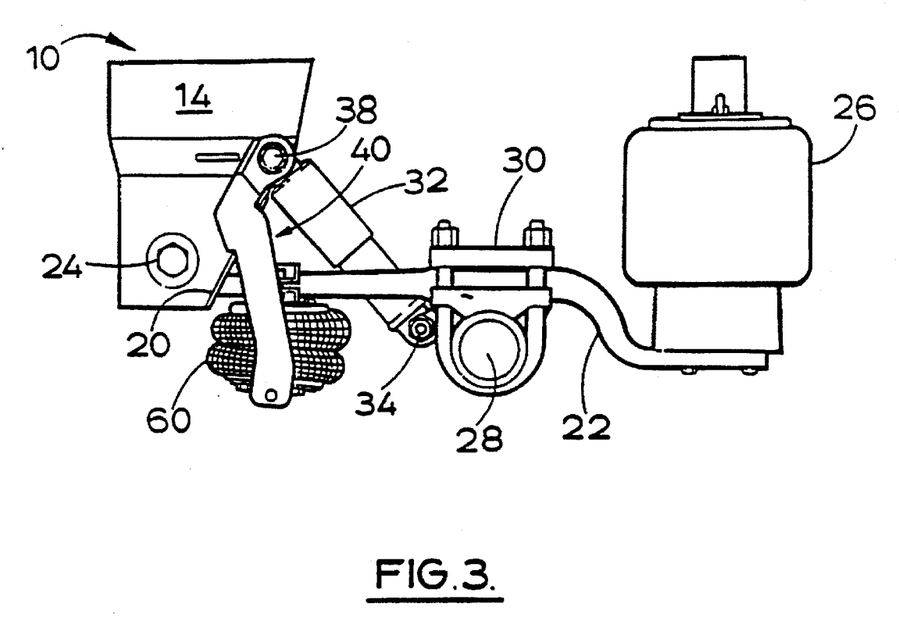
FIG. 3 is a side view of the suspension system of the embodiment of the invention.

From the pivot 24, the longitudinal member 22 extends rearwardly, being connected at a rear end portion to an air spring 26. The air spring 26 is also connected to the chassis, and acts as a compression spring between the longitudinal member 22 and the chassis.

Between the pivot 24 and the air spring 26, an axle 28 of the vehicle is secured to the longitudinal member 22 by a clamp 30.

A telescopic suspension damper 32 interconnects the axle 28 and the bracket 10. The damper 32 has first and second mounting eyes through each of which a bolt may be passed to secure the damper 32 to a suspension component. The first eye is secured to the clamp 30 by a bolt 34. The second eye is secured to the bracket 10, the eye engaging with one of a pair of lugs 36 projecting therefrom, a bolt 38 passing through the lug 36 and the eye 38 to secure the damper 32.

A cradle 40 depends from the bracket 10. The cradle 40 comprises a pair of arms 42,44 and a base member 46.

Each arm 42,44 has an upper plate portion 50 through which there is a circular aperture. The lugs 36 of the bracket 10 each extends through the aperture of a respective arm, the arms being secured by the pivot bolt 38 and a cooperating nut.

Each arm 42,44 further comprises a lower portion 52 which depends from the respective upper portion 50, and is connected thereto by a stepped portion 54. The stepped portion 54 displaces the lower portion 52 with respect to the corresponding upper portion 50 outwardly from the bracket 10. Each stepped portion 54 abuts a corresponding flange 20 of the bracket 10 for resisting pivotal movement of the cradle 40 in a direction of rearward movement of the lower portions 52 of the arms. A lug 56 projects from each arm to engage a respective flange 20 to resist pivoting movement of the cradle in the opposite direction.

The base member 46 interconnects lower portions 52 of the arms 42,44 remote from the upper portions 50. The base member 46 is attached as by welding to each of the arms 42,44. The base member 46 constitutes a platform member of the cradle 40. In an alternative configuration, the platform member may comprise a pair of base members each attached as by welding to one of the arms 42,44, and by engagement with a slot in the other, such that the two arms 42,44 may be separated from one another to facilitate mounting of the cradle 40.

An air bag 60 is supported on the platform member and extends to the longitudinal member 22. The air bag 60 is secured to the platform member by a plurality of bolts which extend through apertures 62 in the platform member to engage with a lower part of the air bag 60, and to constitute anchorage means for the air bag.

The air bag 60 is secured to the longitudinal member 22 by a clamp 64. The clamp 64 (which is shown in detail in FIGS. 4 and 5) comprises upper and lower clamp members 66,68, and constitutes coupling means for the air bag.

Figure 5:
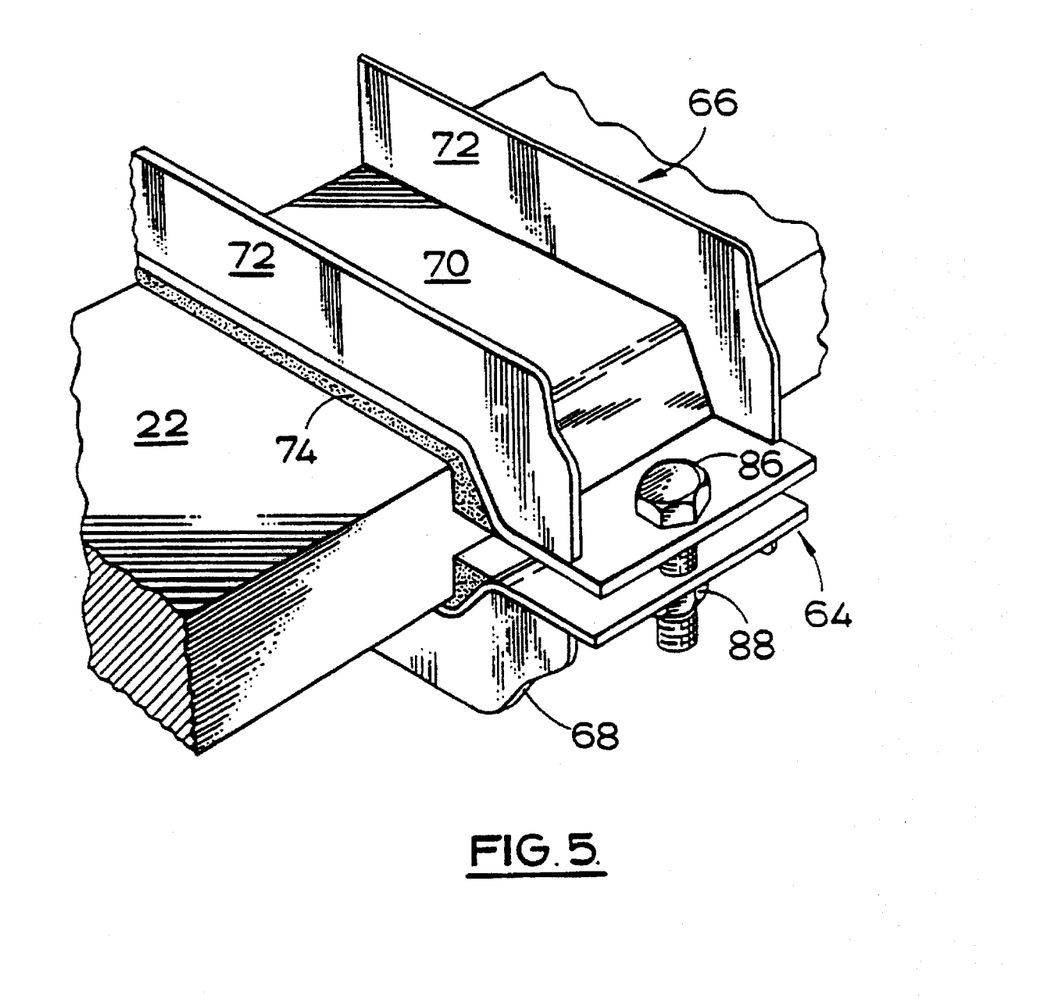
FIG. 5 is a scrap view of a clamp on a longitudinal member of the suspension of the first embodiment.

The upper clamp member 66 comprises a metal strap 70 which extends across the longitudinal member 22. End portions of the strap 70 which project laterally beyond the longitudinal member 22 are displaced downwardly towards the lower clamp member 68 and are each provided with a through hole. A pair of strengthening flanges 72 project perpendicularly from the strap 70. A pad 74 of hard rubber is disposed between the strap 70 and the longitudinal member 22, the pad 74 being a close fit between the strap 70 and the longitudinal member 22.

Figure 4:
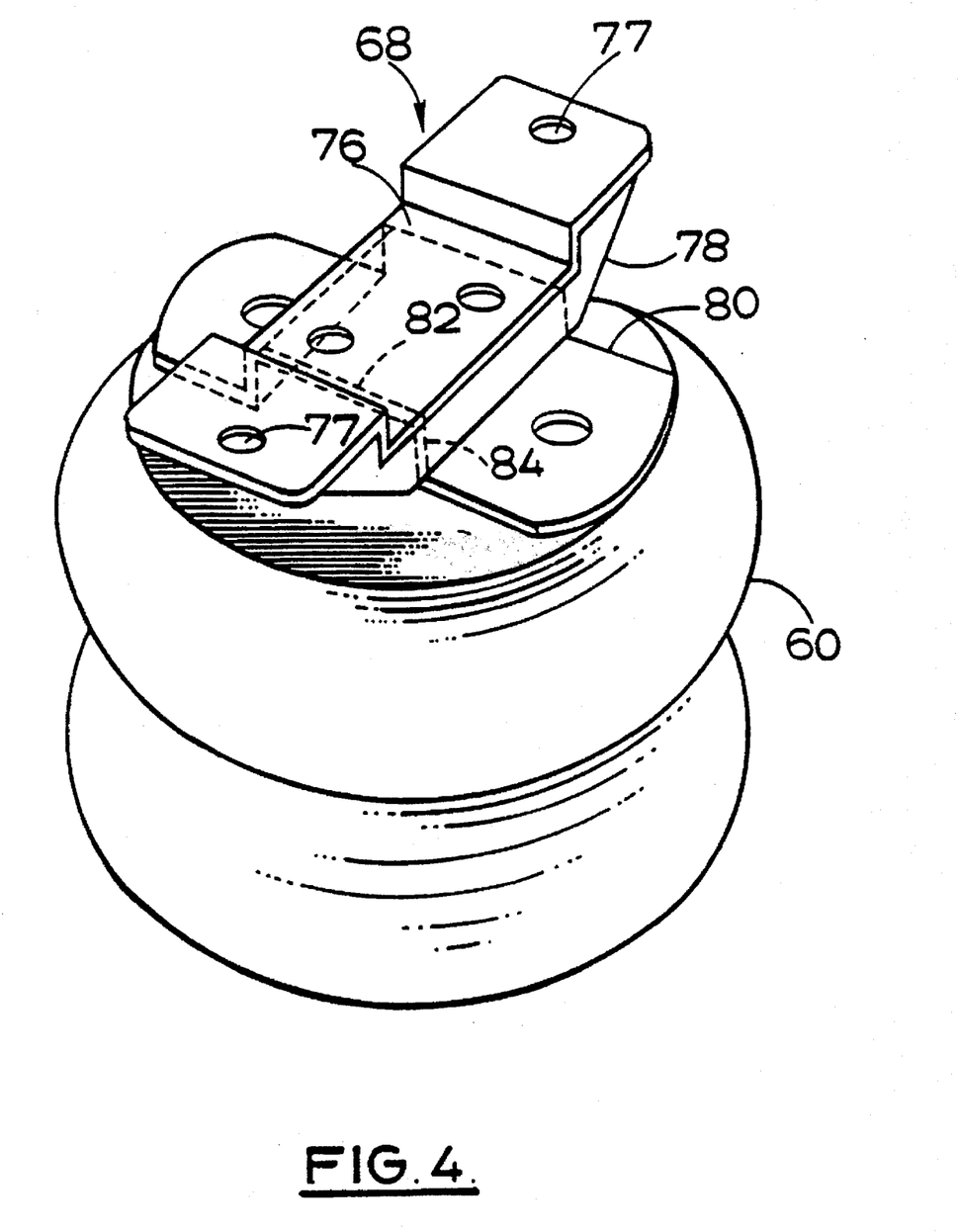
FIG. 4 is a view of an air bag and a lower half clamp being parts of the first embodiment of the invention.

The lower clamp member 68 comprises a strap 76 having through holes 77, a pad and strengthening flanges 78 of similar configuration to those of the upper clamp member 66, these components being in an inverted disposition to engage a lower surface of the longitudinal member 22. The base of the lower clamp member 68 acts as a bearing means for mechanically interconnecting the air bag 60 and the longitudinal member 22 and to transmit force therebetween on inflation of the air bag 60. The lower clamp member 68 is secured to a mounting plate 80 having apertures through which bolts pass to secure the plate 80 to the top of the air bag 60.

A central portion 82 of the plate 80 is upstanding from the air bag 60 and on this portion 82 the strap 76 is supported.

The intermediate portions 84 of the plate 80 adjoin the central portion 80 and are perpendicular thereto. The intermediate portions 84 abut inner surfaces of the strengthening flanges 78.

The upper and lower clamp members are secured together by bolts 86 passing through the apertures 77 and associated nuts 88 so as to clamp securely the longitudinal member 22 between themselves. This substantially eliminates longitudinal or transverse movement between the longitudinal member and the top of the air bag 60.

In a vehicle suspension system, an arrangement as described above is typically provided adjacent both ends of the axle 28. In the case of a vehicle with independent suspension, the axle 28 is replaced with a pair of stub axles on opposite sides of the vehicle, each provided with an arrangement as described above, and each of which carries one or more road wheels.

In use, when an axle 28 of a vehicle is to be raised, air pressure is removed from each air spring 26 associated with that axle 28. Air pressure is then applied to each air bag 60 associated with the axle 28, causing the air bags 60 to expand. The lower end of each air bag 60 is secured to the platform of the respective cradle 40 and so cannot move downwards. Thus, upwardly-directed force is applied through the respective clamp 64 and pad to the longitudinal member 22, so causing the longitudinal member 22 to pivot upwardly, raising the axle 28 as it does so. Operation of the system on an independently suspended vehicle is similar, with, each of a pair of stub axles being raised simultaneously.

Figure 6:
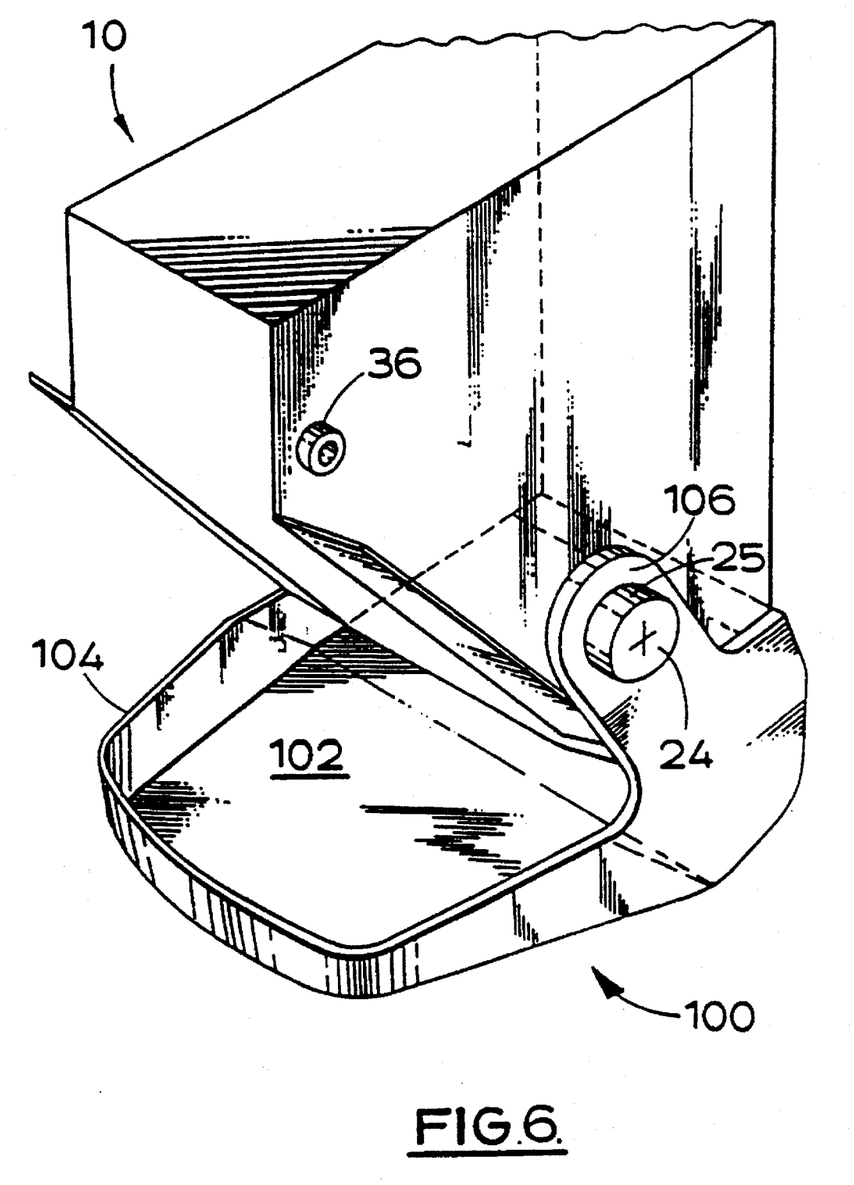
FIG. 6 is a perspective view of a platform member being a part of a second embodiment of the invention.

With reference now to FIG. 6, there is shown an alternative cradle 100 for use in a second embodiment of the invention mounted on a suspension bracket 10 as described above.

The cradle 100 of the second embodiment comprises a platform 102 on which an air bag (not shown) may be supported. The platform 102 is surrounded by an upwardly directed flange 104, two portions of which are formed as upwardly extending lugs 106. Each lug 106 has an aperture through which passes a respective spigot or location collar 25 of the suspension bracket 10. A further portion of the flange 104 to the front of the cradle 100 engages with a lower surface of the bracket 10 to resist pivotal movement of the cradle 100 about the axis of the spigots 25.

In this embodiment, an air bag acts between the platform 102 and a longitudinal member of the suspension (not shown) to lift that member in a manner substantially similar to that described above in relation to the first embodiment, including a clamp as 64.

Figure 7:
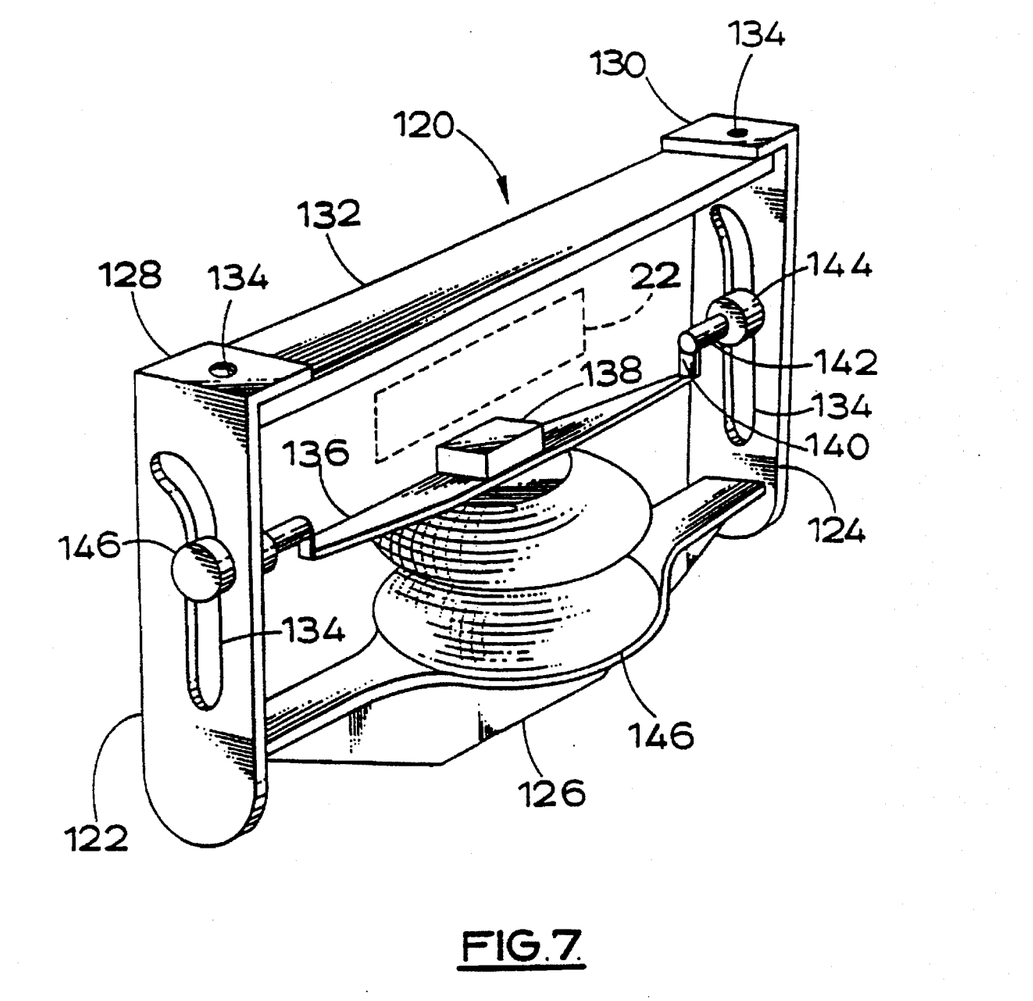
FIG. 7 shows an alternative cradle with air bag and constraint, being parts of a third embodiment of the invention.

With reference to FIG. 7, a lifting system of a third embodiment of the invention comprises a cradle 120 comprising a pair of side members 122,124 between lower portions of which extends a platform member 126 which may be constructed in a manner similar to the platform member of the cradle 40 of the first embodiment described above.

Upper end portions 128,130 of the side members 122,124 extend horizontally towards one another, upper portions of each member being an inverted 'L' shape in profile.

A cross member 132 is secured to lower surfaces of each upper end portion 128,130 by bolts extending through holes 134 in the cross member 132 and upper end portions 128,130.

Each side member 122,124 has a slot 134 passing through it. Each slot 134 has a substantially vertical lower portion and an upper portion which curves towards the front of the vehicle.

A beam 136 extends transversely of the cradle 120, the beam carrying on an upper surface centrally a block of rubber 138 as bearing means. At each end of the beam 138 there is secured an arm 140 on which is carried a shaft 142 which extends through a slot in a respective arm 122,124. Each shaft 142 carries inner and outer guide rollers 144,146 disposed on opposite sides of each arm 122,124. Alternatively, the beam may be provided with means which engage outer surfaces of the arm, and are guided thereby.

An air bag 146 is secured to the platform member 126 and to the beam 136, inflation of the air bag 146 causing the beam 136 to travel upwardly (its path being guided by the shafts 142 in the slots 134, thereby restraining movement of an upper part of the air bag 146 to a path defined by the slots 134.

In use, the cradle is secured (for example, by welding) to a bracket of a vehicle suspension, as described above. A longitudinal member 22 of the suspension passes through the cradle between the beam 136 and the cross member 132. On inflation of the air bag 146 the beam 136 moves upwards, the rubber block 138 engaging a lower surface of the longitudinal member 22, whereupon further inflation of the air bag causes the longitudinal member 22 and a road wheel attached thereto to move upwards.

I claim:

1. An air suspension system for a vehicle comprising a longitudinal member extending generally lengthways of the vehicle and mounted to the vehicle for pivotal movement about an axis generally transverse of the vehicle, an air spring disposed to act between the longitudinal member rearwards of the axis and the vehicle, and a road wheel carrier disposed on the longitudinal member rearwards of the axis, wherein the suspension system further comprises a lifting system for lifting at least one wheel of the vehicle comprising a cradle having a platform member and two arms each arm connecting the platform member to the vehicle, the arms being disposed to opposite sides of the longitudinal member, the lifting system further comprising an air bag disposed to act between the platform member and the longitudinal member such that inflation of the air bag causes upward pivoting movement of the longitudinal member, so raising the or each wheel connected thereto.

2. An air suspension system according to claim 1 in which the road wheel carrier comprises a stub axle on which one or more wheels is carried, a similar suspension system being provided for opposite wheels on left and right sides of the vehicle.

3. An air suspension system according to claim 1 in which the road wheel carrier comprises an axle extending transversely of the vehicle, to carry road wheels for left and right sides of the vehicle.

4. An air suspension system according to claim 1 further comprising anchorage means by which a lower part of the air bag is secured to the platform member.

5. An air suspension system according to claim 1 further comprising coupling means by which an upper part of the air bag is connected to the longitudinal member.

6. An air suspension system according to claim 5 in which the coupling means substantially prevents relative movement between an upper surface of the air bag, and the longitudinal member.

7. An air suspension system according to claim 1 further comprising guide means interconnecting an upper part of the air bag and the cradle and operable to constrain movement of an upper portion of the air bag relative to the cradle to a desired path.

8. An air suspension system according to claim 7 in which the guide means comprises a beam having end portions or end fittings, and the arms of the cradle have guides or slots within which the end portions or end fittings are constrained to travel.

9. An air suspension system according to claim 1 having bearing means disposed to mechanically interconnect the air bag and the longitudinal member on inflation of the air bag.

10. An air suspension system according to claim 9 in which the bearing means comprises a block of rubber or plastics material.

11. An air suspension system according to claim 1 further comprising pivot means by which the longitudinal member is secured to the vehicle, the cradle being adapted for connection to the pivot means.

12. An air suspension system according to claim 11 in which the pivot means comprises a pivot bolt extending along the transverse axis about which the longitudinal member pivots, the arms of the cradle having holes through which the pivot bolt extends.

13. An air suspension system according to claim 11 in which the pivot means comprises a pivot bolt extending along the transverse axis about which the longitudinal member pivots, the arms of the cradle having holes through which the pivot bolt extends, and the cradle carrying stop means to resist its pivoting about the pivot bolt.

14. An air suspension system according to claim 1, further comprising a suspension damper connected to the longitudinal member and, by pivot means, to the vehicle, the cradle being connected to the vehicle by the pivot means.

15. An air suspension system according to claim 14 in which the pivot means comprises a pivot bolt, the arms of the cradle having holes through which the pivot bolt extends.

16. An air suspension system for a vehicle comprising a longitudinal member extending generally lengthways of the vehicle and mounted to the vehicle for pivotal movement about an axis generally transverse of the vehicle, an air spring disposed to act between the longitudinal member rearwards of the axis and the chassis, a road wheel carrier disposed on the longitudinal member rearwards of the axis, and a suspension damper connected to the longitudinal member and, by mounting means, to the vehicle, the suspension system further comprising a lifting system for lifting at least one wheel of the vehicle comprising a cradle adapted for connection to the said mounting means and an air bag supported by the cradle and arranged, on inflation thereof, to urge the longitudinal member upwardly, so raising the wheel carrier.

17. An air suspension system according to claim 16 in which the mounting means comprises a pivot element, the cradle having members through which the pivot element extends.

* * * * *